Patented Jan. 30, 1945

2,368,165

UNITED STATES PATENT OFFICE 2,368,165

SYNTHETIC RESIN AND PROCESS OF MAKING SAME

James E. Shand, Verona, N. J., assignor to Ellis Laboratories, Inc., a corporation of New Jersey No Drawing. Application May 27, 1942, Serial No. 444,684

7 Claims. (Cl. 260—97)

This invention relates to the preparation of synthetic resinous bodies and involves more specially the preparation of such bodies from oleoresin.

Oleoresin is the exudate of pine trees and is often designated as crude turpentine. It consists essentially of volatile material (spirits of turpentine) 15 to 20%, rosin (principally abietic acid) 70 to 74%, and resenes (non-volatile and unsaponifiable constituents) 4 to 10%. Although the actual composition of a particular sample of oleoresin may differ somewhat from that just given, nevertheless the above given composition represents average values for the various constituents. As usually obtained, oleoresin is a rather thick, viscous though readily-flowable mixture consisting of liquid and undissolved solid materials, the last-named being mainly rosin containing some resenes. It generally possesses a sticky or tacky feel when, for example, rubbed between the fingers of one's hand.

One object of this invention is the preparation of a solid, non-liquid, homogeneous resinous material from oleoresin. Another object is to make from oleoresin solid resinous bodies which are clear, translucent and substantially non-tacky. By the term non-liquid I mean the resins made according to my invention are solid at ordinary temperatures. They may be liquefied, however, by the application of heat.

I secure these resinous bodies by treatment of oleoresin with an inorganic acid reagent which is both a dehydrating and a polymerizing agent. Examples of such are sulphuric acid, phosphoric acid, phosphorus pentoxide as well as acid salts such as sodium or potassium bisulphate, sodium dihydrogen phosphate and the like. In most instances it is necessary to treat the oleoresin with only a small proportion, say 5 or 10 per cent by weight, of the polymerizing agent. Reaction is effected by heating the mixture of oleoresin and polymerizing agent to slightly elevated temperatures, generally about 100° to 150° C.

The quantity or proportion of polymerizing agent should be sufficient to bring about conversion of the liquid oleoresin to a mass which is solid at ordinary temperatures and substantially insoluble in water. Employment of excessively large quantities of polymerizing agent may result in the formation of substantial amounts of water-soluble materials. This later condition I seek to avoid. As previously mentioned, 5 to 10 per cent of polymerizing agent is enough in most instances to bring about the desired results.

The temperature of interaction likewise should be controlled carefully so as to avoid any charring or other deleterious effect on the reactants. As mentioned above, temperatures of 100° to 150° C. are suitable in most cases, though somewhat higher or lower temperatures are not precluded.

Generally one to two hours' treatment with the polymerizing agent is enough to secure conversion of the liquid oleoresin to a homogeneous mass which is solid at room temperatures. However, a heating period of four, five or six hours sometimes may be necessary. The time will vary, of course, with the quantity of reactants employed or with the proportion of catalyst or polymerizing agent used. Removal of a small sample from a reaction mixture and dropping it into water will quickly indicate whether or not interaction has continued for the requisite period of time.

When the latter condition has been obtained the reaction product (i. e., resinous bodies admixed with catalyst) is washed well with water to remove the acidic polymerizing agent. Afterwards, if desired, the resinous product can be steam-distilled to eliminate any volatile, unreacted constituents which may remain in the resinous bodies made according to my invention. In most instances the quantity of distillable liquid material obtained in this manner will be very small since by far the greater proportion will have taken part in the reaction or reactions leading to the formation of solid resinous bodies. The resin can then be freed substantially of entrained water by subjecting it to a mild heating operation, either under reduced pressure or at atmospheric pressure.

Products made in the manner just described will be translucent though varying in color from dark brown to light amber. The latter property (i. e., color) will depend upon the conditions maintained during the preparation of the resin, that is the temperature of reaction, quantity of catalyst employed, etc.

Resinous bodies made according to my invention may be lightened in color and simultaneously hardened to a greater extent by treatment with a hydroxide or oxide of an alkaline-earth metal, e. g., barium hydroxide or calcium oxide. The proportion of oxide or hydroxide used in such instances should be equivalent to that or less than that indicated by the acid number of the resin.

The following examples will illustrate my invention and the manner in which it is performed. In these examples all proportions are parts by weight.

*Example 1*—To 56.6 parts of oleoresin were added 5.7 parts of concentrated sulphuric acid (approximately 93 per cent $H_2SO_4$). This mixture was heated at 100° C. for 2 hours, using an air condenser to prevent loss of volatile constituents and a stirrer to prevent excessive bumping during the heating operation. The dark brown resinous product then was treated several times with boiling water to remove the acid catalyst (sulphuric acid). Afterwards the resin was subjected to a mild heating operation under reduced pressure to eliminate water. The solid dark colored material was translucent when melted and cast into blocks and was rather pliable at room temperature. The acid value of this resin was 166.

*Example 2*—To 10 parts of the molten resin, as prepared in Example 1, was added 0.5 part of lime (mainly calcium oxide) and the latter was incorporated thoroughly by mixing and kneading. The product then was allowed to cool and when solid it was found to be much harder than the untreated resin, much more translucent and considerably lighter in color.

*Example 3*—To 56.9 parts of oleoresin were added 2.9 parts of concentrated sulphuric acid (approximately 93 per cent $H_2SO_4$) and the mixture was heated under reflux, as described in Example 1, at 100° C. for 1 hour. At the end of this time the temperature of the mixture was increased to 125° C. and heating continued for 1 hour more. The temperature then was raised to 145–150° C. and maintained at this point for 2 hours. Afterwards, the resinous product was washed 5 times with boiling water to remove completely the acidic catalyst. A dark brown, somewhat brittle but translucent material was secured. This had an acid number of 159.

*Example 4.*—To 71.6 parts of oleoresin were added 7.2 parts of concentrated phosphoric acid (approximately 85 per cent $H_3PO_4$) and the mixture heated under reflux (as described in Example 1) at 120° C. for 4 hours. The temperature then was raised to 140° C. and maintained so for another hour. Afterwards, the reaction product was subjected to steam distillation and a small quantity of unreacted turpentine was secured as a distillate together with some water. The distillation residue, consisting of resin and aqueous solution of phosphoric acid, was separated into liquid and solid portions. The latter (i. e., the solid or resinous material) was dried or substantially freed of entrained water by a mild heating operation. The reaction product in this instance was light brown in color and translucent and had an acid number of 229.

*Example 5.*—To 10 parts of the molten resin, as prepared in Example 4, was added 0.5 part of lime, and the mixture thoroughly stirred. Afterwards 9 parts more of molten resin were incorporated by mixing. The molten mass then was filtered through glass wool to remove all solid particles which did not dissolve in the resin and thereby prevented the securing of a clear, homogeneous material. The filtered product was much lighter in color than that prepared in Example 4, was translucent and had an acid number of 193.

*Example 6.*—To 69.7 parts of oleoresin were added 3.5 parts of phosphoric acid (approximately 85 per cent $H_3PO_4$) and the mixture heated for 5 hours under reflux at a temperature of 145–150° C. with constant stirring. At the end of this time the mixture was washed several times with hot water to remove the phosphoric acid and then subjected to steam distillation to eliminate any unreacted turpentine.

The resulting solid resin was washed again with hot water and afterwards dried at 100–120° C. During the last-named operation the material changed in color from a cloudy yellow to a light brown. It was translucent, somewhat brittle, very slighty tacky and possessed an acid number of 207.

*Example 7.*—To 75 parts of turpentine were added 3.8 parts of concentrated sulphuric acid (approximately 93 per cent $H_2SO_4$) and the mixture heated under reflux for 5 hours at 145–150° C. A dark brown liquid was formed and this was washed with water to remove the sulphuric acid employed as a catalyst. During this latter operation an emulsion was formed and it was necessary to extract this with diethyl ether to effect separation of polymerized turpentine and water. Evaportion of the ether solution yielded liquid polymerized turpentine as a residue. The latter was filtered through paper to eliminate any particles of water or other insoluble substances entrained in the liquid.

*Example 8.*—Eight parts of polymerized turpentine were admixed with 2 parts of rosin (secured by steam-distilling oleoresin and then drying the non-volatile residue) and the mixture warmed cautiously until a clear homogeneous liquid mass was obtained. When allowed to cool, a soft tacky resin having a dark brown color was the product. It should be noted that the proportions of polymerized turpentine and rosin are substantially those for turpentine and rosin in naturally-occurring oleoresin.

*Example 9.*—Sodium acid sulphate, 3.6 parts, were admixed with oleoresin, 72.3 parts, and the resulting mass heated (under reflux) at a temperature of 145–150° C. for 5 hours. The reaction product was washed several times with hot water and then subjected to steam distillation. The non-volatile residue from the last operation was a light brown, somewhat brittle and very slightly tacky resinous body. It had an acid value of 195.

*Example 10.*—To 10 parts of the resinous material, as prepared in Example 9, was added 0.5 part of magnesium hydroxide. The mixture was melted by heating to about 130° C. and the hydroxide incorporated by thorough stirring. On cooling a lighter colored, less tacky but somewhat harder material was obtained than that mentioned in Example 9.

*Example 11.*—Rosin was prepared by steam-distilling oleoresin and afterwards drying the non-volatile residue. The latter was reacted with magnesium hydroxide, using the same method and also proportions of materials as stated in Example 10. The hardened rosin made in this manner was much darker in color than that described in Example 10.

It will be seen from the above description and examples that my invention involves treatment of oleoresin with an inorganic acidic catalyst whereby a solid translucent non-tacky resinous material is obtained. My invention also involves treatment of oleoresin with sulphuric or phosphoric acid under conditions which preclude the formation to any substantial degree of water-soluble compounds such as sulphated or sulphonated turpentine, rosin, etc.

It should be noted that the resinous bodies prepared according to my invention are separate and distinct materials from those made by polymerizing turpentine and incorporating rosin. Compositions as made by the last-named procedure are soft and tacky when the proportion of ingredients (polymerized turpentine and rosin) is the same as that in oleoresin. Increasing the proportion of rosin, of course, will furnish a harder composition but this in turn will be more tacky and will exhibit properties more approaching those of rosin. This is shown by the results given in Examples 7 and 8.

On the other hand, resinous bodies made from oleoresin by my invention are relatively hard materials and unlike rosin are substantially non-tacky. These properties may be the results of several reactions taking place simultaneously during treatment of oleoresin. Thus, not only polymerization of turpentine may occur but also that of rosin as well as condensation of polymerized and/or non-polymerized turpentine with rosin. Regardless of what reaction or reactions occur, the products obtained by my procedure possess and exhibit physical properties unlike those of either rosin or rosin dissolved or admixed with turpentine or polymerized turpentine.

It should be noted also that another property which is characteristic of the resinous bodies prepared according to this invention is that of becoming lighter in color when treated with hydroxides or oxides of alkali-earth metals, i. e., the hydroxides or oxides of barium, calcium, strontium or magnesium. Similar treatment of rosin leads to the formation of a darker colored material. The quantity of hydroxide or oxide suitable for my purpose need not be large, generally an amount equal to 5 per cent of the weight of treated oleoresin, or less, is sufficient.

What I claim is:

1. The process of preparing resinous bodies which comprises bringing natural pine oleoresin substantially free of a miscible liquid diluent into intimate contact with an acidic agent selected from the group consisting of sulphuric acid, phosphoric acid, alkali metal acid sulphates and alkali metal acid phosphates, the proportion of said acidic agent being less than that required for substantial formation of water-soluble bodies from said oleoresin, said acidic agent containing not more than about 15 per cent water, maintaining the temperature during intimate contact of said oleoresin with said acidic agent at not less than about 100° C. and not more than about 150° C., continuing intimate contact of oleoresin with acidic agent until said oleoresin is a substantially solid mass at room temperature, and separating said contacted oleoresin from said acidic agent.

2. The process of preparing resinous bodies which comprises bringing natural pine oleoresin substantially free of a miscible liquid diluent into intimate contact with an acidic agent selected from the group consisting of sulphuric acid, phosphoric acid, alkali metal acid sulphates and alkali metal acid phosphates, said acidic agent containing not more than about 15 per cent water, the proportion of said acidic agent being not less than about 5 per cent and not more than about 10 per cent of the weight of oleoresin, maintaining the temperature during intimate contact of said oleoresin with said acidic agent at not less than about 100° C. and not more than about 150° C., continuing intimate contact of oleoresin with acidic agent until said oleoresin is a substantially solid mass at atmospheric temperature, and separating said contacted oleoresin from said acidic agent.

3. The process of preparing resinous bodies which comprises bringing natural pine oleoresin substantially free of a miscible liquid diluent into intimate contact with an acidic agent selected from the group consisting of sulphuric acid, phosphoric acid, alkali metal acid sulphates and alkali metal acid phosphates, said acidic agent containing not more than about 15 per cent water, the proportion of said acidic agent being not less than about 5 per cent and not more than about 10 per cent of the weight of oleoresin, maintaining the temperature during intimate contact of said oleoresin with said acidic agent at not less than about 100° C. and not more than about 150° C., continuing intimate contact of oleoresin with acidic agent until said oleoresin is substantially a solid mass at atmospheric temperature, separating said contacted oleoresin from said acidic agent, and separating said contacted oleoresin from unreacted liquid constitutents.

4. The process of preparing resinous bodies which comprises bringing natural pine oleoresin substantially free of a miscible liquid diluent into intimate contact with an acidic agent selected from the group consisting of sulphuric acid, phosphoric acid, alkali metal acid sulphates and alkali metal acid phosphates, said acidic agent containing not more than about 15 per cent water, the proportion of said acidic agent being not less than about 5 per cent and not more than about 10 per cent of the weight of oleoresin, maintaining the temperature during intimate contact of said oleoresin and said acidic agent at not less than about 100° C. and not more than about 150° C., continuing intimate contact of oleoresin with acidic agent until said oleoresin is a substantially solid mass at atmospheric temperature, separating said contacted oleoresin from said acidic agent, separating said contacted oleoresin from unreacted liquid constituents, and incorporating an alkali agent selected from the group consisting of hydroxides and oxides of alkali-earth metals with said contacted oleoresin, the proportion of said alkali agent being not less than about 5 per cent of the weight of and not more than about the equivalent of the acid number of the contacted oleoresin.

5. The resinous product resulting from intimate contact of natural pine oleoresin substantially free of miscible liquid diluent with an acidic agent selected from the group consisting of sulphuric acid, phosphoric acid, alkali metal acid sulphates and alkali metal acid phosphates, at a temperature of not less than about 100° C. and not more than 150° C., said acidic agent containing not more than about 15 per cent water and the proportion of said acidic agent being not less than about 5 per cent and not more than about 10 per cent of the weight of oleoresin, said resinous product being substantially a solid at atmospheric temperature.

6. The resinous product resulting from intimate contact of natural pine oleoresin substantially free of a miscible liquid diluent with an acidic agent selected from the group consisting of sulphuric acid, phosphoric acid, alkali metal acid sulphates and alkali metal acid phosphates, at a temperature of not less than about 100° C. and not more than about 150° C., said acidic agent containing not more than about 15 per cent water and the proportion of said acidic agent being not less than about 5 per cent and not more than about 10 per cent the weight of oleoresin, and subsequent incorporation of an alkaline compound selected from the group consisting of oxides and hydroxides of alkali-earth metals with said contacted oleoresin, the proportion of said alkaline compound being not less than about 5 per cent of the weight of and not more than about the equivalent of the acid number of the contacted oleoresin, said resinous product being substantially a solid at atmospheric temperature.

7. The process of preparing resinous bodies which comprises bringing natural pine oleoresin substantially free of a miscible liquid diluent into intimate contact with an acidic agent selected from the group consisting of sulphuric acid, phosphoric acid, alkali metal acid sulphates and alkali metal acid phosphates, said acidic agent containing not more than about 15 per cent water, the proportion of said acidic agent being not less than about 5 per cent and not more than about 10 per cent of the weight of oleoresin, maintaining the temperature during intimate contact of said oleoresin and said acidic agent at not less than about 100° C. and not more than about 150° C., continuing intimate contact of oleoresin with acidic agent until said oleoresin is a substantially solid mass at atmospheric temperature, separating said contacted oleoresin from said acidic agent, and incorporating an alkali agent selected from the group consisting of hydroxides and oxides of alkali-earth metals with said contacted oleoresin, the proportion of said alkali agent being not less than about 5 per cent of the weight of and not more than about the equivalent of the acid number of the contacted oleoresin.

JAMES E. SHAND.